United States Patent [19]

Zeller et al.

[11] Patent Number: 5,724,570
[45] Date of Patent: Mar. 3, 1998

[54] METHOD AND APPARATUS FOR A COMPLETE SQL SUBQUERY ELIMINATION PROCESS

[75] Inventors: Hansjorg Zeller, Los Altos, Calif.; Pedro Celis, Austin, Tex.

[73] Assignee: Tandem Computers Incorporated, Cupetino, Calif.

[21] Appl. No.: 480,963

[22] Filed: Jun. 7, 1995

[51] Int. Cl.$^6$ .................................................. G06F 17/30
[52] U.S. Cl. ......................................... 395/603; 395/604
[58] Field of Search ............................... 395/600, 602, 395/603, 604

[56] References Cited

U.S. PATENT DOCUMENTS

| | | | |
|---|---|---|---|
| 5,367,675 | 11/1994 | Cheng et al. | 395/600 |
| 5,412,804 | 5/1995 | Krishna | 365/600 |

OTHER PUBLICATIONS

Article by R. Ganski entitled "Optimization of Nested SQL Queries Revisited" published by ACM (1987) pp. 23–33.
Article by M. Muralikrishna entitled "Improved Unnesting Algorithms for Join Aggregate SQL Queries" proceedings of the 18th VLDB Conference, Vancouver, British Columbia, Canada (1992) pp. 91–102.
Article by M. Muralikrishna entitled "Optimization and Dataflow Algorithms for Nested Tree Queries" proceedings of the 15th International Conference on very Large Data Bases (1989) pp. 77–85.
Article by Umeshwar Dayal entitled "Of Nests and Trees: A Unified Approach to Processing Queries That Contain Nested Subqueries, Aggregates, and Quantifiers," Proceedings of the 13th VLDB Conference, Brighton (1987), pp. 197–208.
Article by Werner Kiessling entitled "SQL–Like and Quel–Like Correlation Queries with Aggregates Revisted," Department of Electrical Engineering and Computer Science, University of California, Berkeley, CA, pp. 1–14, No Date.
Article by Won Kim entitled "On Optimizing an SQL–Like Nested Query," published by ACM Transactions on Database Systems, vol. 7, No. 3, (Sep. 1982), pp. 443–469.
Article by Pirahesh et al., entitled "Extensible/Rule Based Query Rewrite Optimization in Starburst" published by ACM Sigmod 8393 SI6 MOD Record, No. 2, Jun. 1992, pp. 39–48.
Article by Mumick et al., entitled "Implementation of Magic–sets in a Relational Database System" published by ACM Sigmod, 8393 SI6 MOD Record No. 2, Jun. 1994, pp. 103–114.
Lee, Sanggoo, "Semantic Query Optimization in Recursive Databases", IEEE, pp. 444–451, Feb. 1988.
Jan, Yiming, "Algebraic Optimization for Nested Relations", IEEE, pp. 278–287, Jan. 1990.
Cardiff, J.P., "The use of Integrity Constraints to Perform Query Transformations in Relational Databases", IEEE, pp. 103–106, Mar. 1990.
Godin et al, "Semantic Query Optimization Using Inter–Relational Functional Dependencies", IEEE, pp. 368–375, Jan. 1991.
Shekar et al, "Learning Transformation Rules for Semantic Query Optimization: A Data–Driven Approach", IEEE, pp. 950–964, Dec. 1993.
Sarathy et al, "Algebraic Foundation and Optimization for Object Based Query Languages", IEEE, pp. 81–90, Apr. 1993.
Wei et al, "Semantic Query Optimization for Tree and Chain Queries", IEEE, pp. 136–151, Feb. 1994.

*Primary Examiner*—Thomas G. Black
*Assistant Examiner*—Donald Min
*Attorney, Agent, or Firm*—Graham & James LLP

[57] ABSTRACT

A method for subquery elimination for a relational model database based on the SQL language running a database management system (DBMS) under the TANDEM NONSTOP (tm) operating kernel. A series of seven transformation rules are applied to eliminate nested queries in the SQL language. The method and teachings of the present invention generalizes to all types of nested subqueries in SQL, allowing for more efficient computations, allocation and maintenance of system resources.

25 Claims, 6 Drawing Sheets

METHOD AND APPARATUS FOR A COMPLETE SQL SUBQUERY ELIMINATION PROCESS

BACKGROUND OF THE INVENTION

The invention relates to an improved method of implementing a database management system (DBMS) for a relational model database based on the SQL language. SQL is a data sublanguage developed in the late 1970's by IBM for access to relational databases that are managed by relational database management systems (RDBMS). SQL has become popular for its ability to be used by widely varying systems and has become the de facto standard for the relational database world.

A data sublanguage is one that is used in association with another language (the primary programming language or host language) for the specialized purpose of accessing data. A relational model database is one having characteristics as expressed by E. F. Codd, "A Relational Model of Data for Large Shared Data Banks", *Communications of the ACM*, June 1970. Such characteristics include representing data independent of the physical representation of data, independent of the relationships between data, and having implementation considerations related to efficiency. A relational database can be distinguished from record-type "network" databases (that typically use pointers to data), hierarchical model databases, object-oriented databases or CODASYL databases.

As can be appreciated by one skilled in the art, a database management system (DBMS) is a special computer program built to store data into, retrieve data from, and modify data stored in a database. In general, DBMS's require that a user define the format of the data very specifically, such as the number of items, data types, and how the items are related to one another. Typically, a DBMS is used to process a transaction—a atomic unit of work—meaning it must completely succeed or be aborted. Such transactions are typical in a credit and debit scheme such as a changes to a database of bank accounts, where there is a transferal of money from one account to another.

The basic unit of data in a relational database is the "relation". In SQL the relation is analogous to the "table", which is defined in a less rigorous manner than a relation in that a table can have duplicate rows, unlike a pure relational database relation where the tuples (rows) cannot be duplicates. Data is stored in a table in SQL in rows. A relation (or table in SQL) is made up of one or more attributes (or "columns" in SQL). Each column has associated with it a data type. Data types may be bit and character strings (the entire string in SQL is considered as an atomic or fundamental data type), exact numerics, including integers numeric (floating point), decimal, "approximate numerics", date times, including intervals of times, logic and null values (which include TRUE, FALSE and UNKNOWN). SQL supports strong typing data conversions and both static and dynamic execution.

The most important operation in SQL is the "selection" or identifying of a specific row or rows in a table, which can be accessed through the keyword SELECT. Selection is done by specifying one or more predicates that are used to filter a table to identify the rows for which the predicate is true. A predicate is a question asked, with the answer in the form of TRUE, FALSE, or UNKNOWN (if insufficient information is available to determine the question reliably). Typically in SQL language the searching or selection is for a particular row-data.

Common operations in SQL language are the JOIN, UNION and GROUP BY operations. The JOIN operation typically combines information from two tables to create a third "virtual" table (one that does not exist prior to the running of the operation that creates it) that contains information with a common column in both tables but with columns not found in either joined table. The JOIN operation is equivalent to the "product" dataflow operator. The UNION operation causes no ordering of rows but simply appends rows from one table to another. The GROUP BY operation produces one row for all rows in the input table that have a certain column (or columns) in common. Thus, by way of example, the query for a video store database:

"SELECT movie_type, AVG (current_rental_price) FROM movie_titles GROUP BY movie_type" will, when searching a table having columns: "title", "movie_type", "current rental price"; give a virtual table with columns "movie_type" and "AVG (current_rental_price)", where different types of movies (e.g., Westerns, Action films, Romances) will be listed with their average rental price listed (SQL has a keyword AVG for computing averages).

SQL, when represented by dataflow trees, can be cast into two main classes of operators: "relational operators" and "item operators". Relational operators are such operators such as projection, selection, join and union, (or, in related SQL keyword analogues, such as by SELECT, GROUP BY, SCAN, etc.) and often indicated in this disclosure by "<QRY>". Item operators, or expressional operators, are indicated in this disclosure as "<EXPR>", and include such operators as "empty" (a no-op simply used for an expression that does not produce any output value), "constant" (specifies a constant value of some data type), and aggregate functions such as "any", "once", "anyone", "any_true". Aggregate functions are expressions used as an argument (predicate) by a relational operator, such as a GROUP BY operator. E.g., the "once" aggregate function returns its input, if the group contains more than one element; the "anyone" aggregate function indeterministically returns one value from the group; the "any_true" function returns TRUE if it finds any row that evaluates to TRUE, it returns NULL, if no rows evaluate to TRUE but some evaluate to NULL, and it returns FALSE otherwise.

SQL also provides for queries within queries. However, a DBMS may have degraded performance if such queries within queries—or "nested queries"—are present. One object of the present invention is to eliminate such nested queries, often termed 'sub-select' elimination.

Figure 2A:
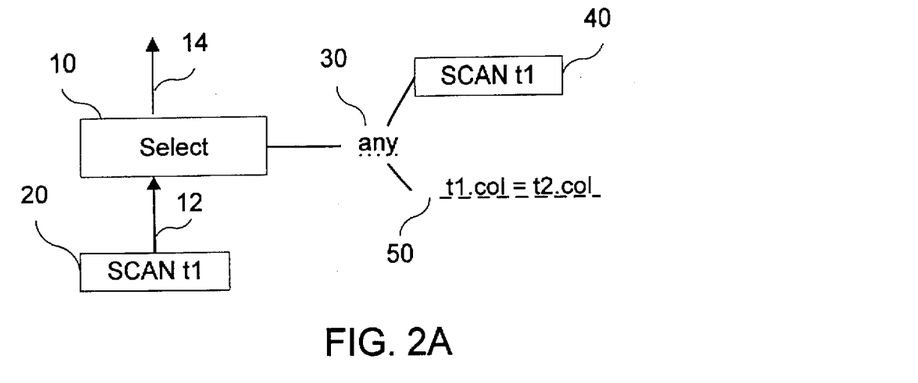
FIGS. 2A, 2B and 2C are schematics depicting the dataflow tree graphic implementation of a one normalization rule for the transformation method of the present invention.

One way to describe the present invention, to perform 'sub-select' elimination by the unnesting of subqueries through eliminating calls to item operator expressions ("<EXPR>") from in between relational expression operators ("<QRY>"), is graphically on a dataflow tree diagram. Thus, graphically on the dataflow tree diagrams shown in the figures, sub-select elimination is performed when there are no "islands" of relational expression operators ("<QRY>" or the rectangles in the figures, the nodes or leaves of the tree) in-between the item operator expressions ("<EXPR>"). By way of example, <QRY> relational operator 40 in FIG. 2A is such an "island." Of course it should be understood that such a graphical representation is to aid a human in understanding the transformation, as again a computer running a SQL language normalizer does not deal with graphical trees per se.

A complete guide to the SQL language of the 1992 version, SQL-92, is found in SQL standards document ISO/ANSI SQL92 (ISO92), incorporated herein in its entirety. Furthermore, the recipe for transforming SQL into dataflow tree diagrams (and vice versa) as shown in the figures herein is found in this ISO92 standard. Further understanding of the SQL language can be found in the textbook "Understanding the new SQL: a complete guide", J. Melton, A. R. Simon, (1993, Morgan Kaufmann Publishers), incorporated by reference herein.

SUMMARY OF THE INVENTION

The invention describes a component in a relational database system that eliminates "subqueries" from relational database queries by transforming them into semantically equivalent forms. Subqueries are queries within queries, and may take up excessive system resources to process. The process of rewriting SQL to eliminate subqueries is a process called by many names, such as "sub-select elimination", "unnesting of subqueries", "subquery elimination", or "subquery transformation".

The process described by the present invention transforms all possible forms of subqueries that the SQL92 language (as described in the standard ISO/ANSI SQL92 [ISO92]) into unnested forms.

The present invention is described for conceptional purposes using the data flow model, where a relational query is represented as a dataflow tree diagram of relational operators, such as projection, selection, join and union. Thus, while the present invention describes subquery elimination as a transformation from one dataflow tree with subquery expressions in it into another, semantically equivalent dataflow tree without subquery expressions in it, it should nonetheless be understood that the SQL language has no provisions in it for reproducing trees in and of itself. The method by which the SQL language is represented by dataflow model trees is found in the SQL92 ISO92 standard referenced above and incorporated herein.

Using the teaching of the present invention all types of subqueries that are allowed in the full SQL92 language can be eliminated. By contrast to published techniques that only apply to a small subset of subqueries, the present transformation is much more powerful because it generalizes to all types of nested subqueries.

The dataflow model of the present invention contains operators that slightly extend the relational model. In particular, it contains operators that model a nested execution of a JOIN, allowing one subtree of the JOIN to reference values of the other subtree (known as a 'nested join' or 'nested loop join' in the literature, see, e.g., C. J. Date, "An Introduction to Database Systems", (Addison Wesley, 1990, 5th ed.)).

The present invention in one embodiment implements the transformation by the construction of transformation rules that eliminate subqueries dependent on the chosen operator and using a nested JOIN operator to represent the result of the transformation. The rules themselves are expressed in dataflow tree notation. In the preferred embodiment the actual SQL transformation rules are implemented in hardware with TANDEM computers running the TANDEM NONSTOP (tm) operating kernel, or NSK.

'Select' has two different definitions in the literature and herein, one of which is SELECT as a keyword in SQL language, and the other is to describe a filter for queries. When using the term 'select' as a SQL keyword herein, it is capitalized, italicized, and/or placed in apostrophes.

In the present invention, finding the general case for the improved method of implementing a database management system (DBMS) to eliminate nested subqueries (termed a "transformation" for compactness) is complicated by the fact that predicate answers have 'conditional' answers such as UNKNOWN. The present invention addresses this problem.

Two types of subselects are scalar subselect and quantified subselect. Scalar subselect returns an SQL data type, while quantified subselect returns a logical value.

As described above, the data structures in SQL that are needed to describe the subquery elimination rules of the present invention are in terms of expression nodes and relational query nodes (as described above). These nodes are shown graphically in the figures of the present invention.

Expressional nodes, <EXPR>, also called "item expressions", and include such expressions as "empty", "constant", aggregate functions such as "once", "anyone", "any_true", and subqueries such as any(QRY, EXPR).

For instance, common expression operators (this set of operators can be extended freely with any other needed operators except those that use <QRY> expressions) include such common simple item expressions as:

<EXPR> ::=<constant>
<EXPR> ::=<SQL column reference>
<EXPR> ::=not(<EXPR>)
<EXPR> ::=add(<EXPR1>,<EXPR2>)
<EXPR> ::=subtract(<EXPR1>,<EXPR2>)

. . . and so on. The meaning of these type of common simple expression operators is clear to one of ordinary skill and not material to the present invention.

Expression operators also include specialized aggregate functions. These functions are used in the normalization rules of the present invention and include:

<EXPR> ::=once(<EXPR>)
<EXPR> ::=any_true(<EXPR>)

Other aggregate functions may be added on demand from the teachings of the present invention.

Expression operators include subquery item expressions as well. Subquery item expressions are used to represent SQL subqueries as the input to the normalization rules, such as:

<EXPR> ::=any(<QRY>,<EXPR>)
<EXPR> ::=all(<QRY>,<EXPR>)
<EXPR> ::=one_row(<QRY>)

As before, expressional nodes (item expressions), <EXPR>, include such elementary expressions as constants, arithmetic operators and the like. But there are two classes of item expressions that are of special importance to the present invention: specialized aggregate functions and subquery expressions. Aggregate functions can only be used in the argument to an "aggregate" relational expression.

The following aggregate functions are hence described:

once(<EXPR>)==the "once" function returns its input, if the input query (of the aggregate relational expression) contains exactly one row. It raises an error, if the input query contains more than one row. If the input query contains no rows, the "once" aggregate function returns a NULL value;

any_true(<EXPR>)==the "any_true" aggregate function returns "TRUE" if there is any row in the input query of the "aggregate" operator for which the expression passed in as <EXPR> evaluates to "TRUE". Otherwise it returns "NULL" if some of the input rows evaluate to "NULL", or "FALSE" for all other cases.

Further, the following subquery expressions are used in this description. It is possible to express all subqueries from ISO/ANSI SQL92 with the following list of subquery expressions:

any(<QRY>,<EXPR>)==the "any" expression evaluates to "TRUE" if any row in the <QRY> input satisfies the expression <EXPR>. It evaluates to "NULL" if some rows in the input query evaluate to NULL and no rows in the input query evaluate to "TRUE", otherwise the "any" expression evaluates to "FALSE";

all(<QRY>,<EXPR>)==this aggregate function is equivalent to "not (any<<QRY>, not(<EXPR>)))";

one_row(<QRY>)==the "one_row" expression evaluates to the result row of the <QRY> input query, if that query returns exactly one row. It evaluates to rows consisting of "NULL" values if the input query contains no rows. If the input query returns more than one row, the "one_row" expression raises an exception condition (the exception condition is defined in the ISO/ANSI SQL92 standard).

A relational query node is a query dataflow tree node that describes a table in terms of an extended relational algebra expression. A relational query node may have as a predicate (argument) an expressional node. A query parse tree node takes zero or more other queries as input parameters and produces an output table. Query objects also utilize expressions in order to drive their control flow and in order to calculate values. Query objects maintain a "current row" of their output result and make that row accessible to expressions contained in them and to other query nodes.

Query nodes (<QRY>) are defined by the following:— tuple-producing (row-producing) operators (leaf nodes of the tree), such as:

<QRY> ::=scan (<EXPR>, table_name)
    <QRY> ::=tuple(<EXPR>) —extended relational algebra operators:
    <QRY> ::=select(<QRY, <EXPR>)
    <QRY> ::=project(<QRY>,<EXPR>)
    <QRY> ::=product(<QRY>, <QRY2>)
    <QRY> ::=aggregate(<QRY>, <EXPR>)

where the relational query nodes are defined as:

scan (<EXPR>, table_name)==this is a scan on a named table, selecting all rows that satisfy the key predicate EXPR and all columns;

select(<QRY, <EXPR>)==the "select" operator specifies a boolean selection expression EXPR, to be applied on the rows of the QRY argument. Its result is the QRY argument, minus the rows where EXPR evaluates to FALSE or NULL>;

project(<QRY>,<EXPR>)==the "project" operator returns the expression EXPR for each row in its QRY argument. None of the original fields are returned. No duplicate elimination is done (ISO/ANSI SQL semantics do not require duplicate elimination);

product(<QRY>, <QRY2>)==the "product" operator forms a Cartesian product of two relational algebra expressions. Each row in QRY1 is combined with each row in QRY2. The current row of QRY1 may be referenced in the QRY2 operand. That is, the product operator is defined in a way that QRY1 is processed in the outer loop, while QRY2 is read in the inner loop. The product operator could also be called nested join;

aggregate(<QRY>, <EXPR>)==the "aggregate" operator performs an aggregation of its rows (from the QRY argument) into a single row. Aggregate functions can be specified to compute the sum, minimum, maximum, etc. for a column in all input rows. As before, some specialized aggregate functions (once, anyone, any_true) are defined herein.

Other relational operators may be added on demand from the teachings of the present invention. If the additional <QRY> nodes contain subqueries, an appropriate normalization rule in accordance with the teachings made herein needs to be selected according to the decision criteria outlined in Table B below (p. 25).

As can be appreciated by one skilled in the art, an important SQL statement is the 'query specification', which starts off with the keyword SELECT. A query specification (using SELECT) is allowed to return more than one row. The query specification is the most basic operation that deals with tables in SQL, and is used to build virtual tables out of actual tables. Virtual tables are not normally materialized but the columns and rows of virtual tables are computed when necessary.

The basic form of a query specification is "railroad form", which is shown on p 176 of the Melton textbook and in text is represented as:

SELECT select-list table-expression or,
    SELECT quantifier select-list table-expression where "quantifier" is either DISTINCT or ALL. If no quantifier is specified the default is ALL. ALL means "don't eliminate any duplicates from the resulting table", while DISTINCT means "if the table that results from the query specification has any duplicate rows, eliminate all redundant duplicates—all of them except one."

"select-list" typically is represented by an asterisk "*", meaning "all columns that are part of the table corresponding to the table-expression".

"table-expression" is an expression involving tables and creating a virtual table, and has the format:
    from-clause
    [where-clause]
    [group-by-clause]
    [having-clause]

DETAILED DESCRIPTION OF THE PREFERRED EMBODIMENTS

Turning now to the transformation of the present invention, there is disclosed a plurality of particular examples which one skilled in the art can use to construct the general case.

Figure 1:
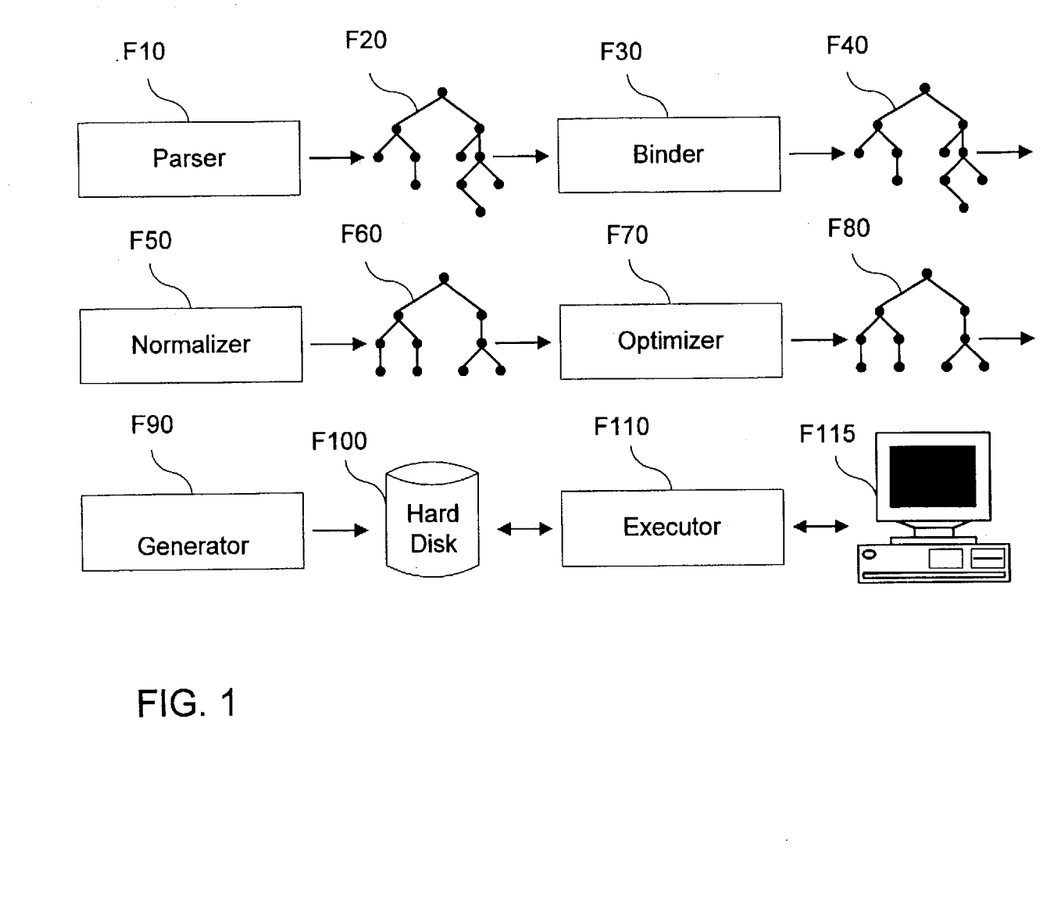
FIG. 1 depicts the components of the DBMS of the present invention.

To begin with, turning to FIG. 1, a SQL expression can be decomposed visually into a upward propagating tree F20 by a parser F10. In the database management system (DBMS) of the present invention, the parser F10 would run under the TANDEM NONSTOP (tm) operating kernel as part of at least one workstation, such as workstation F115. The nodes of the tree can be decomposed into "relational query nodes", indicated in FIGS. 2-6 by text surrounded in boxes, or as "expression nodes", indicated by text that is not surrounded by boxes. A tree such as represented by tree F20 is outputted by the parser. The binder, binder F30 in FIG. 1, which is analogous to a linker, then links together definitions necessary for SQL and outputs a tree F40. It is in a normalizer F50 in FIG. 1, where the normalization rules of the method of practicing the present invention reside. The normalizer, like the parser, binder, optimizer, generator and executor, would run inside at least one workstation such as workstation F115. The normalizer takes tree F40 as input and performs the normalization rules as described herein for subquery elimination and outputs a normalized and syntactically transformed but equivalent tree F60 to a optimizer F70, which optimizes the tree so that it is more efficiently traversed. A generator F90 outputs the final tree to a storage medium, such as secondary storage memory hard drive F100. An executor F110 then may access the final tree from the secondary storage memory hard drive F100 when needed, as indicated by the double headed reference arrow in FIG. 1.

The normalization rules of the present invention reside in normalizer F50, a program residing in primary storage memory (RAM) of a preferably TANDEM computer running under the TANDEM NONSTOP Operating Kernel, rather than residing in the parser F10, binder F30, optimizer F70, generator F90, hard disk F100 or executor program F110. However, the normalization rules of the present invention could be made to reside in any of these other subcomponent programs.

The motivation for unnesting subqueries, besides to increase computational and executing efficiency, is that there is no need for software engineers to support SQL nested queries for the optimizer, generator and executor, but only for the normalizer. This saves execution speed and the cost of maintaining a SQL program, which may have thousands of lines of code.

Turning now to a preferred embodiment of the present invention, the method for achieving the transformation of unnesting subqueries will be described as a series of normalization rules. These transformation rules are illustrated in dataflow tree model form. These transformation rules or "normalization rules" describe how the "any", "all" or "one_row" expression operators can be eliminated from a tree, leaving a tree where no expression (EXPR) node has a relational node (QRY) as its child. Again, this is done by the "normalization phase" of the DBMS program, in normalizer F50 of FIG. 1.

It is known to those of ordinary skill that all subqueries in the SQL92 language can be expressed in terms of "any", "all" or "one_row" predicates. The normalization rules described herein give the outline for how to form a dataflow tree diagram where the "any", "all" or "one_row" expression operators can be eliminated from the tree, leaving a tree where no expression node (<EXPR>) has a relational node (<QRY>) as its child. The teachings of the present invention may be extended from these rules by one of ordinary skill in the art to encompass all aspects of subquery transformation in SQL.

A. Normalization Rules summarized in Text

The normalization rules may be summarized in text as follows:

Normalization Rule No. 0 (NR1)

all (Q,E)→not(any(Q, not E)

This is a very simple example (not illustrated), but the following table, Table A, illustrates this transformation is valid.

TABLE A

| Result of Evaluating E on all rows of Q | all(Q,E) | Result of evaluating (not E) on all rows of Q | not (any (Q, not E)) |
|---|---|---|---|
| Q is empty | TRUE | empty set | TRUE |
| at least one row evaluates to FALSE | FALSE | TRUE and other values | FALSE |
| all rows evaluate to TRUE | TRUE | all FALSE | TRUE |
| otherwise: some rows are NULL, some may be TRUE | NULL | NULL and maybe FALSE | NULL |

Normalization Rule No. 1 (NR2)

For certain simple forms of subqueries in a "select" node, a simple transformation is possible as best described below graphically in a dataflow tree diagram in connection with FIGS. 2A, 2B.

Normalization Rule No. 2 (NR3)

Normalization rule No. 2 (NR3) is a generalized example of rule No. 1 (NR2), with three assumptions: (1) the subquery appears in the "select" predicate, (2) the subquery has a Boolean result (TRUE, FALSE) and (3) the subquery can reference a child node of the "select" predicate.

The result of an "any" predicate inside an expression can be calculated by a query that returns a single row with a single column of boolean type that has the value of the "any" predicate:

any (Q,E)→aggregate (Q, any_true(E)).

(where Q stands for a relational predicate or operator and E stands for expressional predicate or operator).

Figure 3A:
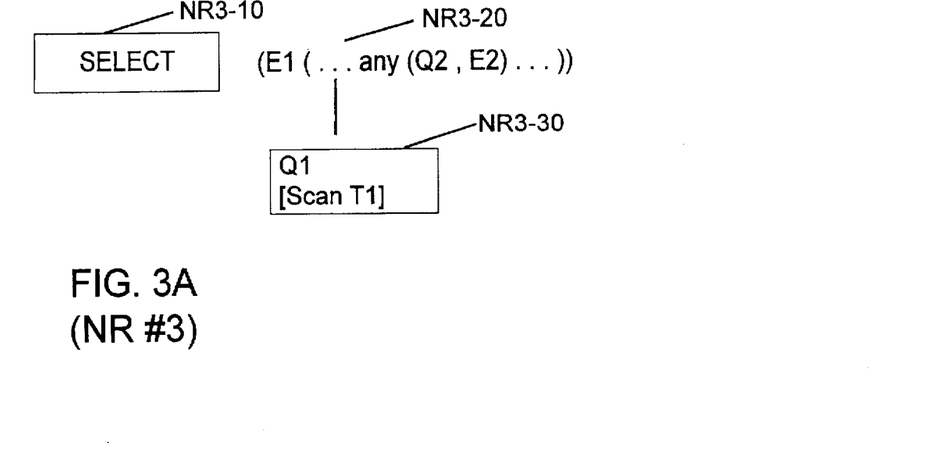
FIGS. 3A and 3B are schematics depicting the dataflow tree graphic implementation of another normalization rule for the transformation method of the present invention.
Figure 3B:
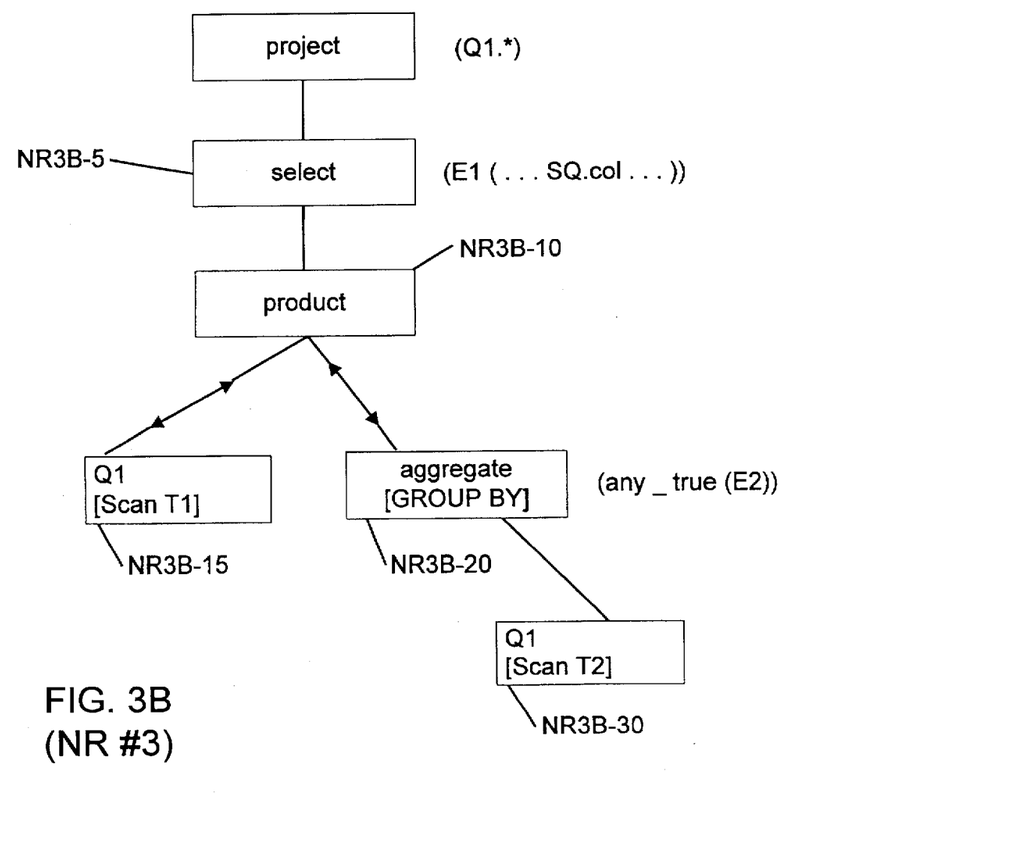

Normalization rule No. 2 is also depicted graphically in FIGS. 3A and 3B. Note the expression ". . . SQ.col . . . " in FIG. 3B refers to the output value of the aggregate query NR3B-20.

Normalization Rule No. 3 (NR4)

The result of a "one_row" predicate can be calculated by a query that returns a single row or an error:

one_row(Q)→aggregate (Q, once (*)).

This normalization rule eliminates a "one_row" expression inside a "select" node, and is best represented graphically as shown below in connection with FIGS. 4A, 4B.

Normalization Rule No. 4 (NR5)

Figure 5A:
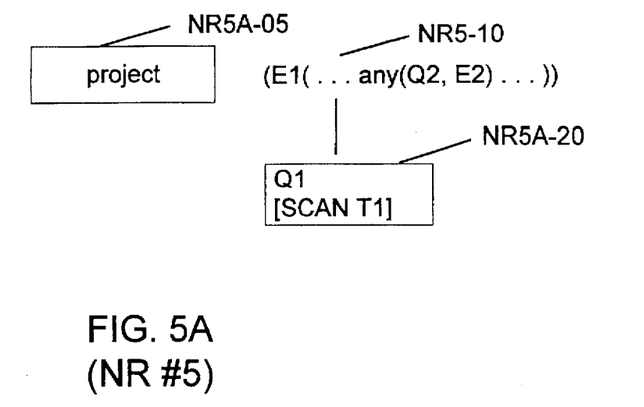
FIGS. 5A and 5B are schematics depicting the dataflow tree graphic implementation of another normalization rule for the transformation of the present invention.
Figure 5B:
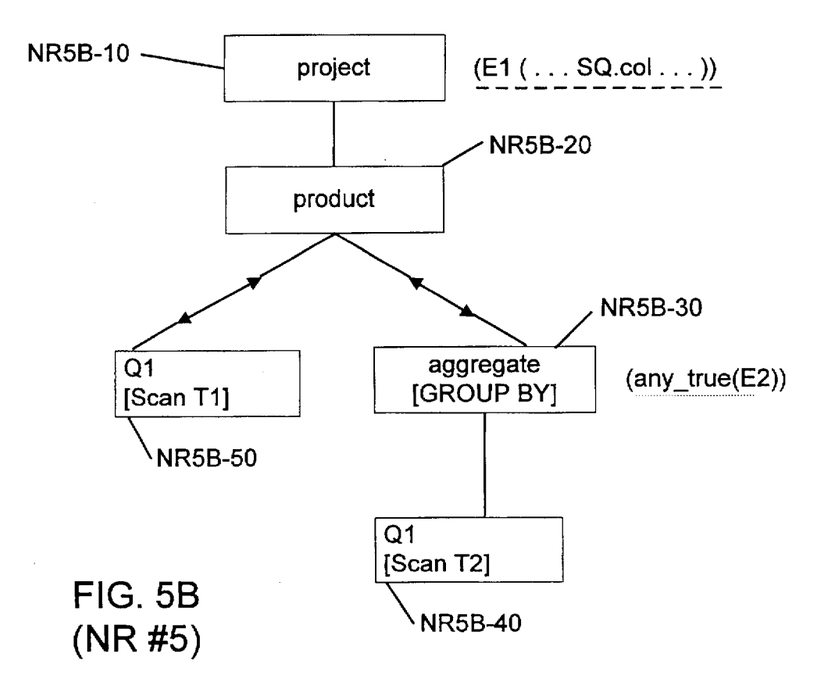

For project nodes with a subquery in the projection, the transformation is best described as below in connection with the graphical dataflow tree of NR4, in connection with FIGS. 5A, 5B.

Normalization Rule No. 5 (NR6)

Similar considerations as NR3 apply to "sort" nodes and to "aggregate" nodes. This normalization rule is best summarized as described below.

Normalization Rule No. 6 (NR7)

This normalization rule deals with nodes that use an input expression with a subquery, like "scan", "tuple" and similar nodes. It is best summarized as described below graphically in connection with FIGS. 6A and 6B.

B. Normalization Rules Described Graphically
Normalization Rule No. 1

EXAMPLE NO. 1

(NR2)

Turning attention to example No. NR2, there is shown the SQL query:

ex. NR1:

"select * from t1 where t1.col in (select t2.col from t2)" which means, given a Table t1, with a plurality of rows, each row having a column t1.col with a certain value(s), scan each row in table t1 and evaluate the condition "t1.col in (select t2.col from t2)", which means find if the certain column value in table t1 is found in column t2.col of a row in table t2. In essence, this formulation searches to see if the two tables t1, t2 have a matching value in particular columns.

This recursive query, two levels deep, can be deconstructed into a simpler query. The parser (parser F10 in FIG. 1, described above) decomposes (or parses) the query into the following tree format, shown in FIG. 2A:

"select(scan(t1), any(scan(t2), equal(t1.col, t2.col))"

In our figure, FIG. 2A, as well as the other like figures, text surrounded by rectangles indicates the presence of a relational expression operator, which deal with sets (multiple arguments or predicates) and inputs and return a single value. Relational operators are also indicated by the term "QRY". On the other hand, text not surrounded by boxes in the figures indicate expressional operators or item expressions, and which have a single argument and return a single value, and are indicated by "<EXPR>". A nested subquery can be thought of as a situation where an item expression (single value) has a relational operator as an argument, which creates undesirable complications that this invention seeks to remedy through a series of transformations that will "unnest" such subqueries.

Conceptually, the unnesting of subqueries problem is solved through eliminating calls to item operator expressions ("<EXPR>") from in between relational expression operators ("QRY"). Graphically on the dataflow tree diagrams shown in the figures, there should be no "islands" of relational expression operators ("QRY" or the rectangles in the figures, the nodes or leaves of the tree) in between item operator expressions ("<EXPR>"), such as, by way of example, the "island" represented by the box "SCAN T1" ('scan table T1', shown as ref. no. 40 in FIG. 2A). That is, to unnest subqueries graphically, rectangles holding text (relational expression operators) should be contiguous with one another and depend from one another as shown for example in FIGS. 2B and 2C. In this way the DBMS program can avoid the harmful "recursive" type calls that come with nested subqueries and which take up excessive system resources.

The tree show in FIG. 2A is one graphical representation of a nested subquery representation of the expression:

"select * from t1 where t1.col in (select t2.col from t2)"

The tree is an inverted tree where values are passed from lower levels to higher levels, as indicated by the reference arrows 12, 14 in FIG. 2A. To replace decomposition nodes 30, 40 and 50 in FIG. 2A with an equivalent expression that is unnested, we use the SQL keyword JOIN operator to create a new column that is the "product", a cartesian product, represented by node 60, "JOIN" or "product" in FIG. 2B, to eliminate the "island" expression "SCAN T1", ref. no. 40 of FIG. 2A. The new column JOIN, node 60 in FIG. 2B, will represent whether or not the expression "t1.col=t2.col" is TRUE, FALSE or UNKNOWN in the SQL language.

Figure 2B:
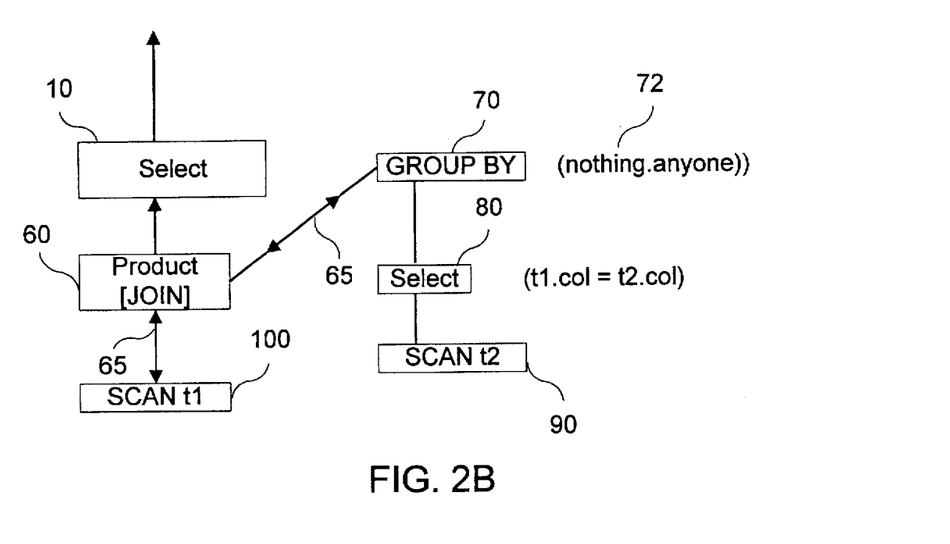

In our example, the product column works by evaluating the expression in nodes 30, 40 and 50 in FIG. 2A, as expression nodes 80, 90 in FIG. 2B, which is an equivalent decomposition in dataflow tree diagram form. The presence of the operator/predicate GROUP BY (nothing, anyone), as indicated by node 70, has been found to ensure that duplicative columns and answers to queries do not propagate up the tree. The argument (predicate) "anyone" in node 70 has a similar function to t1.col=t2.col (node 50) in FIG. 2A.

At node 60 in FIG. 2B, the answer propagated upwards will be either TRUE or FALSE.

Note in FIG. 2B and in all figures where a double headed arrow is shown leading to and from the "product" relational expression operation node 60, the "product" operation is defined such that its right hand operand (node 70 in FIG. 2B) can reference values that are generated in its left hand operand (node 100 in FIG. 2B).

Thus the tree shown in FIG. 2B is the same semantically in SQL as the tree shown in FIG. 2B for ex. No. NR1. Graphically, as can be seen from inspection, the nodes or leaves of the dataflow tree of FIG. 2B where there are relational expression operators (boxes) are not isolated as "islands" but are contiguous with one another and dependent from one another in the manner shown, as is characteristic of the transformed, unnested subqueries throughout this invention.

Figure 2C:
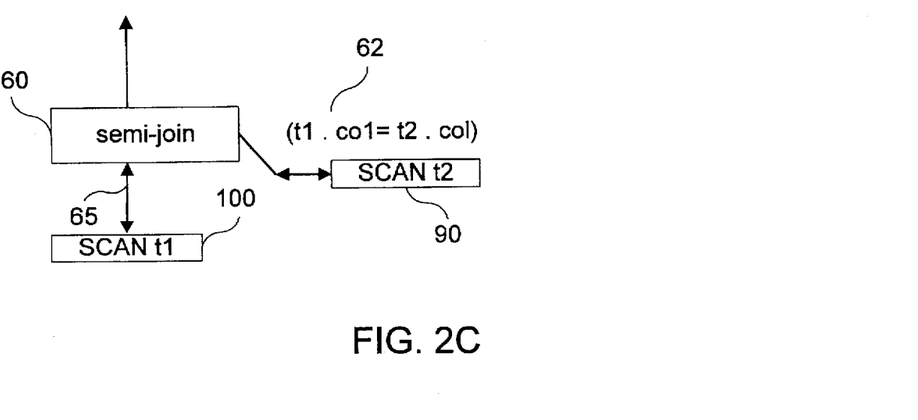

Another syntactically equivalent dataflow tree diagram expression of the nested subquery of FIG. 2A is shown in FIG. 2C. FIG. 2C employs the "semijoin" operator, which is an operator well known to those skilled in the art. See for example the semijoin operator as defined in the normalization rule described in W. Kim, "On Optimizing an SQL-like Nested Query", *ACM Transactions on Database Systems* 7/3, 1982, pp. 443–469, incorporated by reference herein.

As can be seen from inspection of FIG. 2C, the relational operators 60' ("semijoin"), 90' (SCAN T1) and 100' (SCAN T2) are not isolated between expressional operators such as 62' (t1.col=t2.col).

Normalization Rule No. 2 (NR3)

Turning attention now to the problem of eliminating "any" expressions that appear inside a "select" node (as predicates), Normalization Rule No. 2 (NR3) transforms the select nodes that contain these "any" expressions, using the 'semi-join' operation. E.g. one may have a SQL query such as:

SELECT * FROM T WHERE (B/(3*(SELECT MIN(col1) FROM T1)))>5−(SELECT MAX(T2.col2+T.col) FROM T2)

To solve the general subquery elimination problem, one formulates an equivalent query SQ for a given "any" expression (or for a given "one_row" expression), such that SQ returns a single row with the same value as the original expression. Two cases will be looked at and should be sufficient to give one skilled in the art an understanding of this normalization rule No. 2.

In the first case, the result of any "any" predicate inside an expression can be calculated by a query that returns a single row with a single column of boolean type that has the value of the "any" predicate (where Q stands for a relational predicate or operator and E stands for expressional predicate or operator):

any(Q,E)→aggregate (Q, any_true(E)).

All the rows of the result Q are passed to the "aggregate" operator. The "aggregate" reduces these rows to a single row with the value TRUE, if any rows satisfy the predicate E. A NULL value is returned if no rows of the input query evaluate to TRUE, but some rows evaluate to NULL. In all other cases, FALSE is returned as the result.

In the second case, the result of a "one_row" predicate can be calculated by a query that returns a single row or an error:

one_row (Q)→aggregate (Q, once (*)).

This transformation is similar to the one for the "any" predicate. Instead of returning TRUE and FALSE values, the "aggregate" simply selects the single qualifying row, or, if no rows qualify, a single row with all columns set to NULL. The "once" aggregate function raises an error if Q returns more than one row.

Using the above examples as equivalence rules, one can transform "select" nodes with "any" predicates in their expressions to equivalent query nodes that use a "join" (product) with the equivalent query SQ that was discussed above. The notation E( . . . X . . . ) represents the parse tree of an expression E that somewhere contains a subtree X. X may appear at an arbitrary location, for example in the item operator ref. no. 72 in FIG. 2B in the item operator 72 at node 70 (at "anyone"), as an argument of a comparison operator or an arithmetic operator. The 'input' node used in the transformation is a reference to a named value:

select (Q1, E1( . . . any(Q2, E2) . . . )), as shown graphically in FIG. 3A in dataflow tree form, which is to be transformed into the unnested subquery tree shown in FIG. 3B.

That is, the graphical dataflow tree of FIG. 3A, which has nested subqueries, is semantically equivalent to the tree of FIG. 3B, with QRY nodes NR3B-10 and NR3B-20, the "product" and aggregate function "GROUP BY" nodes, together with the EXPR "any_true", replacing nested expression NR3-20 in FIG. 3A as shown. Note the expression ". . . SQ.col . . ." in the "select" node (NR3B-5) FIG. 3B refers to the output value of the aggregate query NR3B-20. Graphically, as can be seen from inspection, the nodes or leaves of the dataflow tree of FIG. 3B where there are relational expression operators (boxes) are not isolated as "islands" but are contiguous with one another and dependent from one another in the manner shown, as is characteristic of the transformed, unnested subqueries throughout this invention.

Note that subquery elimination rules may have to be applied repeatedly, since an expression may contain more than one subquery or nested subqueries. Note also that the above transformation rule does not make any assumptions about the form of an expression that contains a subquery. Finally, note that in the original tree the subquery Q2 can contain "outer references" to the query Q1. In the figures this is represented by double arrows, such as the double arrows 65 between the "QRY" nodes 60, 70 and 60, 100 in FIG. 2B for example. In the transformed tree this is possible since the "product" operator is defined such that its right operand can reference values that are generated in its left operand.

Normalization Rule No. 3 (NR4)

The result of a "one_row" predicate can be calculated by a query that returns a single row or an error:

one_row (Q)→aggregate (Q, once (*)).

Figure 4A:
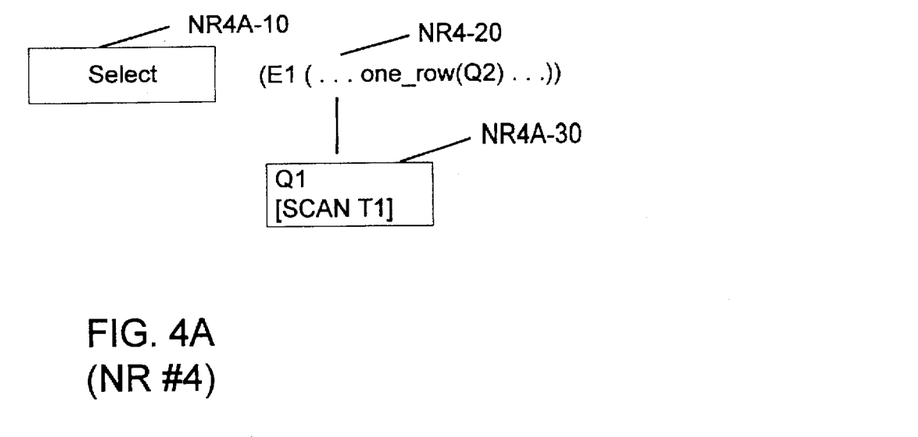
FIGS. 4A and 4B are schematics depicting the dataflow tree graphic implementation of another normalization rule for the transformation method of the present invention.
Figure 4B:
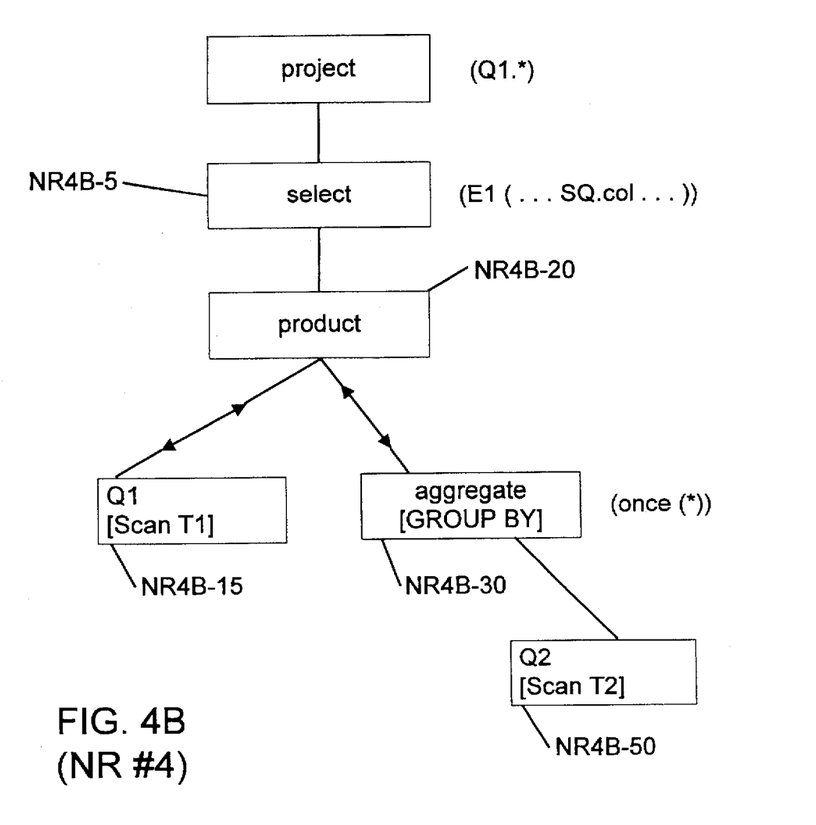

This normalization rule eliminates a "one_row" expression inside a "select" node, and is best represented graphically as shown in connection with FIGS. 4A, 4B.

E.g., given the nested subquery dataflow tree of FIG. 4A, it must be transformed into the unnested subquery tree shown in FIG. 4B.

To do this, one replaces the aggregate function ". . . one_row(Q2) . . . ", represented by ref. no NR4-20 in FIG. 4A, with the aggregate function(GROUP BY) "once(*)", represented at ref. no. node NR4B-30 in FIG. 4B.

Thus here, compared to normalization rule NR3, as can be seen by comparing FIG. 4B (NR4) with FIG. 3B (NR3), instead of talking about Boolean values, which is what the "any_true( . . . )" aggregate function returns (compare ref. no. NR3B-20), the transformation of NR4 (FIG. 4B) returns a real value.

Normalization Rule No. 4 (NR5)

Another example where a subquery appears in the projection expression is for "project" nodes, where there is a nested subquery in the project clause. Consider the query shown graphically in FIG. 5A. Here, an "any" expression appears at predicate ref. no. NR5A-10. To unnest this type of expression, one transforms it from the dataflow tree of FIG. 5A into the dataflow tree form shown in FIG. 5B. As before, the expression E1 (node NR5B-10 via the product node NR5B-20) can reference values from the query Q1 (node NR5B-50) and that Q2 (node NRSB-40) can also reference values from Q1, as indicated by the double headed arrow in FIG. 5B.

While the example of NR5 only shows the transformation for the "any" predicate, the one_row predicate may be similarly transformed.

Normalization Rule No. 5 (NR6)

Normalization Rule No. 5 (not illustrated) has similar considerations as Normalization Rule No. 2 (NR3). In Normalization Rule No. 5, "sort" nodes and "aggregate" nodes are considered. In each case, the child query (or queries) can be replaced by the product of the original query/queries with the single row that represents the result of the "any" predicate. The sort or aggregate operation can then be performed on the newly formed table with the extra column, which will later have to be removed again. Thus, if one were to look to a dataflow diagram tree as in FIG. 5B, there would instead of the expressional operator aggregate function "any_true" the Boolean expressional operator "one_row".

Normalization Rule No. 6 (NR7)

Nodes that use an input expression with a subquery, like "scan", "tuple" and similar nodes, have the problem that the child query can reference the output values of the expression that contains the subquery. For these cases, the "product" between the child query and the result of the subquery has to be reversed. Note that in these cases the subquery Q2 [Scan T2] is not allowed to reference the child query Q1 [SCAN T1] of the outer node, as indicated schematically by ref. no. NR7B-60 in FIG. 6B (Q2 not equal to Q1).

Figure 6A:
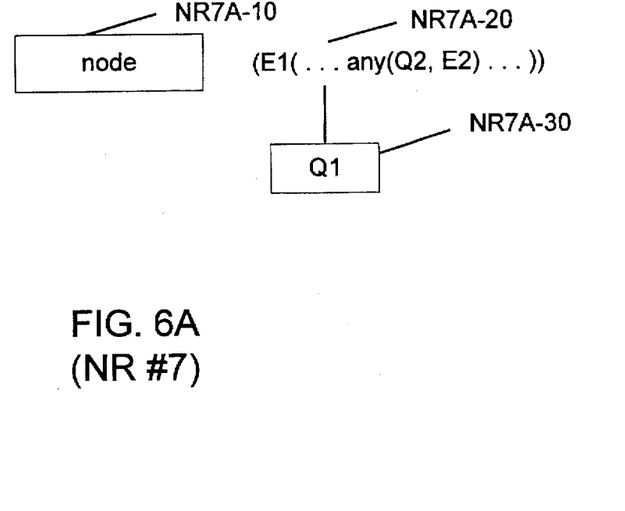
FIGS. 6A and 6B are schematics depicting the dataflow tree graphic implementation of another normalization rule of the present invention.
Figure 6B:
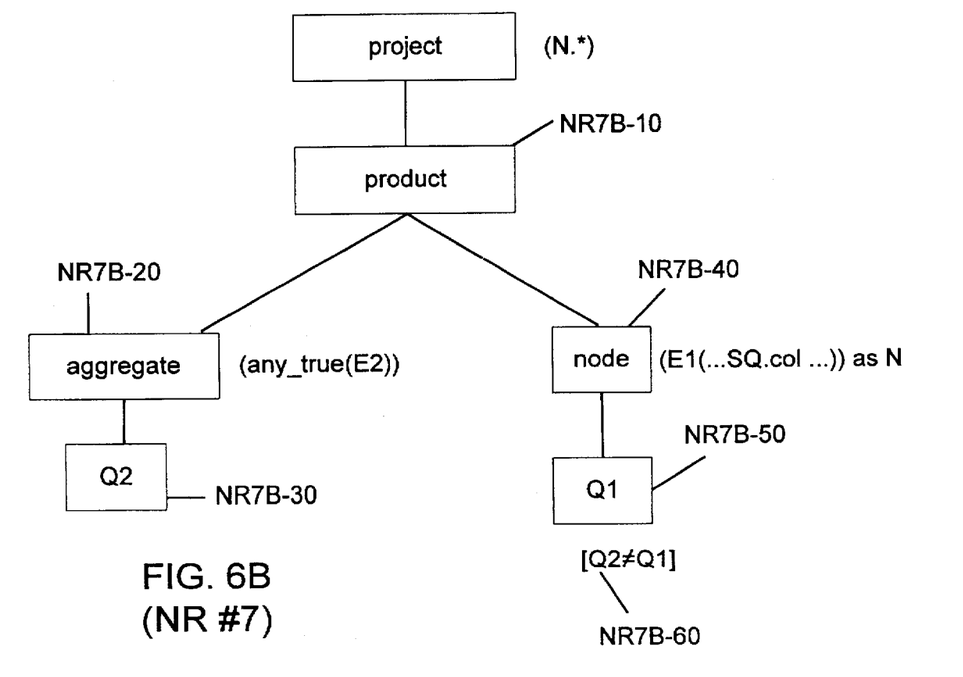

Thus, FIG. 6A shows the nested version of the subquery in datatree form, while FIG. 6B shows the unnested, semantically equivalent version. The "node" in FIG. 6A can be like one of ("scan", "tuple", . . . ) etc.

We can summarize the properties of the above normalization rules NR3–NR7 in a table, Table B, which one of ordinary skill can use to construct other transformation rules for the SQL language:

TABLE B

| Norm. Rule | Boolean | Operator Type | SQ Ref. Outer Table? |
|---|---|---|---|
| NR3 | Y | Select | Y |
| NR4 | N | Select | Y |
| NR5 | Y | Project | Y |
| NR6 | N | Project | Y |
| NR7 | — | — | N (vice versa) |

Further, one skilled in the art will appreciate that any software instructions used to implement the invention described herein (code), data, data structures and any computer hardware incorporating the same form an integrated whole, together with any other similar structures in the network system, to form the present invention.

The foregoing description is offered for illustrative purposes only. Numerous modifications and variations may be readily apparent to those skilled in the art, while still falling within the spirit and scope of the invention as claimed herein below.

What is claimed is:

1. A method for the transformation of a nested SQL query to eliminate all subqueries of the nested SQL query, the method comprising the steps, performed by a computer processor, of:

representing in a memory a nested SQL language query including at least one subquery in a first dataflow tree diagram with nodes of expressional operators and relational operators;

eliminating each of said subqueries of said representing step according to a plurality of predetermined transformation rules being selected from a group of SQL transformation rules including the normalization rules NR1, NR2, NR3, NR4, NR5, NR6, NR7, said eliminating step transforming said nested SQL language query of said first dataflow tree diagram in the memory to a normalized and syntactically transformed equivalent second dataflow tree diagram, so that said relational operators in the second dataflow tree depend from one another and each of said relational operators are not isolated between expressional operators.

2. A method for the transformation of a nested SQL language query to eliminate all subqueries of the nested SQL query, the method comprising the steps, performed by a computer processor, of:

representing in a memory a nested SQL language query in a dataflow tree diagram with nodes of expressional operators and relational operators; and transforming said SQL language dataflow tree diagram in the memory according to a plurality of predetermined rules of transformation being selected from a group of SQL transformation rules including the normalization rules NR3, NR4, NR5, NR6, NR7, so that said relational operators in the transformed dataflow tree depend from one another and are not isolated between expressional operators, and at least one of the normalization rules eliminates all subqueries inside a relational node, wherein each of the subqueries is allowed to reference values generated by a child of the node.

3. A method for the transformation of a nested SQL language query by a computer processor running a database management system to eliminate all nested subqueries, the method comprising the steps, performed by a computer processor, of;

representing in a memory a nested SQL language query in a dataflow tree diagram with nodes of expressional operators and relational operators; and transforming said SQL language dataflow tree diagram in the memory according to a plurality of predetermined rules of transformation being selected from a group of SQL transformation rules including the normalization rules NR3, NR4, NR5, NR6, NR7, so that said relational operators in the transformed dataflow tree depend from one another and are not isolated between expressional operators, and at least one of the normalization rules eliminates all subqueries inside a relational node, wherein each of the subqueries is allowed to reference values generated by the node.

4. A method for the transformation of a nested SQL language query to eliminate all nested subqueries, the method comprising the steps, performed by a computer processor, of;

representing in a memory a nested SQL language query in a dataflow tree diagram with nodes of expressional operators and relational operators; and transforming said SQL language dataflow tree diagram in the memory according to a plurality of predetermined rules of transformation being selected from a group of SQL transformation rules including the normalization rules NR3, NR4, NR5, NR6, NR7, so that said relational operators in the transformed dataflow tree depend from one another and are not isolated between expressional operators, and at least one of the normalization rules eliminates each of the subqueries inside an "input" node, where an input node is defined as a node that passes a result of at least one of the subqueries down to its child node.

5. An apparatus for the elimination of SQL subqueries, comprising:

a parser provided to convert a nested SQL language query to a dataflow tree diagram with nodes of expessional operators and relational operators; and a subquery transformer provided to transform the dataflow tree diagram to a transformed dataflow tree diagram in which no expression node has a relational node as its child, the transformation proceeding in accordance with at least one rule selected from the group of SQL transformation rules NR3, NR4, NR5, NR6, and NR7.

6. The apparatus of claim 5, the group of transformation rules further including NR1 and NR2.

7. The apparatus of claim 5, wherein the subquery transformer is located in a parser of the apparatus.

8. The apparatus of claim 5, wherein the subquery transformer is located in a binder of the apparatus.

9. The apparatus of claim 5, wherein the subquery transformer is located in a normalizer of the apparatus.

10. The apparatus of claim 5, wherein the subquery transformer is located in a optimizer of the apparatus.

11. The apparatus of claim 5, wherein the parser converts a second SQL language query to a second dataflow tree diagram, and further comprising a binder provided to link the first and second dataflow tree diagrams.

12. The method of claim 1, wherein the transforming step transforms multiple subqueries.

13. The method of claim 1, wherein the transforming step transforms recursively nested subqueries.

14. The method of claim 1, wherein the transforming step includes the step of transforming said SQL language dataflow tree in accordance with a normalization rule to eliminate subqueries in an "all" predicate.

15. The method of claim 1, wherein the transforming step includes the step of transforming said SQL language dataflow tree in accordance with a normalization rule to eliminate subqueries in a predicate that is capable of being transformed into an "all" predicate.

16. The method of claim 1, wherein the transforming step includes the step of transforming said SQL language data flow tree in accordance with a normalization rule to eliminate subqueries in an "any" predicate.

17. The method of claim 1, wherein the transforming step includes the step of transforming said SQL language data flow tree in accordance with a normalization rule to eliminate subqueries in a predicate that is capable of being transformed into an "any" predicate.

18. The method of claim 1, wherein the transforming step includes the step of transforming said SQL language data flow tree in accordance with a normalization rule to eliminate subqueries in a "one-row" predicate.

19. The method of claim 1, wherein the transforming step includes the step of transforming said SQL language data flow tree in accordance with a normalization rule to eliminate subqueries in a predicate that is capable of being transformed into a "one-row" predicate.

20. The method of claim 1, wherein said transforming step includes the step of transforming said SQL language dataflow tree in accordance with a normalization rule to eliminate subqueries in a "select" node.

21. The method of claim 1, wherein said transforming step includes the step of transforming said SQL language data flow tree in accordance with a normalization rule to eliminate "one_row" expressions inside a "select" node.

22. The method of claim 1, wherein said transforming step includes the step of transforming said SQL language dataflow tree in accordance with a normalization rule to eliminate subqueries inside a "project" node.

23. The method of claim 1, wherein said transforming step includes the step of transforming said SQL language dataflow tree in accordance with a normalization rule to eliminate subqueries inside a "sort" node.

24. The method of claim 1, wherein said transforming step includes the step of transforming said SQL language dataflow tree in accordance with a normalization rule to eliminate subqueries inside a "groupby" node.

25. The method of claim 1, wherein said transforming step includes the step of transforming said SQL language dataflow tree in accordance with a normalization rule to eliminate a subquery inside an input node.

* * * * *